United States Patent

Chae et al.

[11] Patent Number: 6,104,569
[45] Date of Patent: Aug. 15, 2000

[54] TAPE GUIDE ANGLE CONTROLLING APPARATUS FOR MAGNETIC TAPE RECORDER-PLAYER

[76] Inventors: Youseok Chae, Kwonsun Apt. 69-206, Kwonsun-Dong, Kwonsun-Ku, Suwon, Kyungki-Do; Jiyoung Lee, 316, Booam-Dong, Jongro-Ku, Seoul, both of Rep. of Korea

[21] Appl. No.: 09/245,283

[22] Filed: Feb. 5, 1999

Related U.S. Application Data

[62] Division of application No. 08/701,576, Aug. 22, 1996, Pat. No. 5,901,011.

[30] Foreign Application Priority Data

| Aug. 24, 1995 | [KR] | Rep. of Korea | 95/22086 |
| May 13, 1996 | [KR] | Rep. of Korea | 96/11603 |

[51] Int. Cl.[7] .................................................. G11B 15/60
[52] U.S. Cl. ........................ 360/85; 360/95; 360/130.21
[58] Field of Search ................................. 360/83, 85, 95, 360/130.2, 130.21; 242/346, 346.1, 346.2

[56] References Cited

U.S. PATENT DOCUMENTS

| 3,608,796 | 9/1971 | Morase et al. ............................ 226/21 |
| 4,264,937 | 4/1981 | Kabacinski ................................ 360/85 |
| 4,739,421 | 4/1988 | Narasawa .................................. 360/85 |
| 4,816,927 | 3/1989 | Rijckaert et al. ..................... 360/84 X |
| 5,321,567 | 6/1994 | Kano et al. ............................... 360/85 |
| 5,434,726 | 7/1995 | Song ......................................... 360/85 |
| 5,638,231 | 6/1997 | Okuda et al. ............................. 360/85 |
| 5,726,836 | 3/1998 | Kinjo et al. ............................. 360/109 |

FOREIGN PATENT DOCUMENTS 57-93863  6/1982  Japan .

*Primary Examiner*—William R. Korzuch

[57] ABSTRACT

A tape guide angle controlling apparatus for controlling an orientation of a tape guide in a magnetic tape recorder-player includes a main base, a shaft bushing provided in the main base and having a shaft hole formed in the center thereof, a tape guide arm having at one end portion thereof a rotation shaft rotatably inserted into the shaft hole and at the other end portion thereof having a tape guide, a tape guide horizontal-rotating mechanism for horizontally rotating the tape guide arm, and a tape guide vertical-operating mechanism driven by the tape guide horizontal-rotating member for vertically moving the tape guide arm. The apparatus slants the tape guide which guides a magnetic tape in a reverse running mode, thereby improving the magnetic tape running operation in a reverse running mode.

6 Claims, 8 Drawing Sheets

TAPE GUIDE ANGLE CONTROLLING APPARATUS FOR MAGNETIC TAPE RECORDER-PLAYER

This application is a divisional of application Ser. No. 08/701,576, filed on Aug. 22, 1996, now U.S. Pat. No. 5,901,011, the entire contents of which are hereby incorporated by reference.

BACKGROUND OF THE INVENTION

1. Field of the Invention

The present invention relates to a magnetic tape recorder-player, and more particularly, to a tape guide angle controlling apparatus for a magnetic tape recorder-player which maintains a desired tape running angle during either forward running or reverse running of the tape so as to improve tape running in both cases.

2. Description of Related Art

As shown in FIG. 1, a conventional tape running device in a magnetic tape recorder-player includes a supply guide unit 400 provided on the path along which a tape T is transferred from a supply reel 1 onto a head drum 4, and a roller guide unit 500 provided on the path along which the tape T is transported from the head drum 4 onto a takeup reel 9.

After sequentially passing a first post P0, a tension post 2, a second post P1, a full-erase head 3, a roller P2 and a first slant post SP of the supply guide unit 400, the tape T is supplied to the head drum 4.

The roller guide unit 500 includes a second slant post TP, another roller P3, and audio/control head 5, a third post P4, a capstan 6, a pinch roller 7 and a tape guide 8.

When the tape T is run forward, the tape T runs along the guide units 400 and 500 in the above-described sequence. When run in reverse, the tape T runs in the reverse sequence.

The roller P2, the first slant post SP, the roller P3 and the second slant post TP each enable the tape T to be drawn out, so that the tape T can be wrapped onto the headdrum 4.

In the tape running cycle of the conventional magnetic tape recorder described above, the tape guide 8 serves to guide the tape T during both the forward and reverse tape running modes.

The structure for driving the tape guide 8 in the roller guide unit 500 will now be described.

Referring to FIG. 2, a pivot shaft 11 is mounted on a main base plate 10. A roller arm 12 is rotatably mounted at a hub end thereof on the pivot shaft 11. The tape guide 8 is vertically mounted on the distal end of the roller arm 12. A projection 12' is formed beneath the roller arm 12.

When the tape T is in a forward running mode, the tape guide 8 guides the tape T transferred past the capstan 6 thereto to be wound on the supply reel 9. In the reverse running mode, the tape guide 8 serves to regularly transfer, at a certain angle, the tape T from the takeup reel 9 to the capstan 6.

To operate the roller arm 12 having the tape guide 8 mounted at its one end, as shown in FIGS. 3A through 3C, there is provided a first connection gear 14 engaged to a gear 13' serving as a rotation shaft of a driving source 13. Also, there is provided a second connection gear 15 which is engaged to the first connection gear 14, and a cam gear 16 which is engaged to the second connection gear 15 for transmitting the driving force to the roller arm 12.

On a portion along the periphery of the cam gear 16 a cam arc projection 16' is formed for holding and driving the roller arm 12.

A lever recess 20 is formed at an outer edge surface of a function slide 17. Function slide 17 includes a rack gear 18 formed internally therein engaged to the third connection gear 19. Third connection gear 19 is also engaged to the cam gear 16. A brake protrusion 22 formed at one end portion of a supply reel brake lever 21 movably contacts the outer edge surface of the function slide 17 and follows along the outer edge surface of the function slide 17 to the lover recess 20, whereby an appropriate tension is applied to the tape T wound on the supply reel 9. Reference numeral 23 denotes a brake spring.

Among the operations of the conventional tape guide angle controlling apparatus in accordance with the conventional magnetic tape recorder-player, the forward running of the tape T will be first described.

The tape T supplied from the supply reel 1 is transferred to the head drum 4 by sequentially passing the first post PO, the tension post 2, the second post P1, the full-erase head 3, the roller P2 and the first slant post SP.

Then, the tape T moves via the roller guide unit 500 to the takeup reel 9. In the roller guide unit 500, the tape T sequentially passes the second slant post TP, the roller P3, the audio/control head 5, the third post P4, the capstan 6, the pinch roller 7 and the tape guide 8. At this time, the tape guide 8 moves according to the operation of the roller arm 12.

The cam gear 16 is driven by the operation of the second connection gear 15. Second connection gear 15 is engaged to the first connection gear 14, which is in turn engagedly powered by the shaft gear 13' extended from the driving source 13. With the rotation of the cam gear 16, a cam arc tip 16", formed along the periphery of the cam arc projection 16', pushes the arm projection 12' on the roller arm 12 so that the roller arm 12 is rotated clockwise, whereby the roller arm 12 as shown in FIG. 3A moves to the location thereof shown in FIG. 3B.

The third connection gear 19, which is engaged with the cam gear 16 and also with the rack gear 18 in the function slide 17, drives the function slide 17 from the position shown in FIG. 3A to the right.

To control the tape guide angle in the conventional magnetic tape recorder-player, when the tape T is run forward, the brake protrusion 22 provided at the end of the takeup reel brake lever 21 does not reach the lever recess 20, so the takeup reel 9 can rotate freely because it is not contacted by the takeup reel brake lever 21.

When the takeup reel 9 is not contacted by the takeup reel brake lever 21, the tape guide 8 at the end of the roller arm 12 guides the tape T from between the capstan 6 and the pinch roller 7 so as to be regularly wound onto the takeup reel 9. Meanwhile, when run in reverse, the tape T released from the takeup reel 9 and past the tape guide 8 is guided in the reverse direction compared to the forward running mode.

In the reverse running of the tape T, the tape guide 8 maintains the tape T released from the takeup reel 9 at a certain angle and guides the tape T to the capstan 6. The operation of the tape guide 8 will be described hereunder.

First, when the cam gear 16 and the cam arc projection 16' thereon are driven by the driving source 13, the cam arc projection 16' contacts the arm projection 12' on the roller arm 12 as shown in FIG. 2. Then, the arm projection 12' on the roller arm 12 contacts the cam arc tip 16'" of the cam arc projection 16'.

The third connection gear 19 engaged to the cam gear 16 is operated so as to move the function slide 17 to the right as shown in FIG. 3C.

When the function slide 17 moves to the right, the brake protrusion 22 at the end of the takeup reel brake lever 21 becomes positioned in the lever recess 20. Therefore, the other end of the takeup reel brake lever 21 contacts the periphery of the takeup reel 9, thereby controlling the rotation rate of the takeup reel 9.

The control of the speed of takeup reel 9 adds an appropriate initial tension to the tape T being unwound from the takeup reel 9.

Meanwhile, during forward running, the tape guide 8 maintains an appropriate tension on the tape T while enabling the tape T to be regularly wound onto the takeup reel 9. At this time, to properly guide the tape T from capstan 6, the tape guide 8 should be perpendicular to the main base plate 10. When running in reverse, the tape T having an appropriate tension thereon corresponding to the braking of the takeup reel brake lever 21 is supplied to the tape guide 8.

However, in the tape guide angle controlling apparatus in the conventional magnetic tape recorder-player, when running in reverse, so that the supply reel 1 receives the tape T, because of the long tape running path between the supply reel 1 and the capstan 6 for transporting the tape T, the tape running state becomes weakened when passing over the head drum 4, the first slant post SP and the second slant post TP, because of the long tape running path between the supply reel 1 and the capstan 6 for transporting the tape T. Therefore, the tape T contacted to the third post P4 and the audio/control head 5 may experience fluctuation perpendicularly to the tape running direction.

Therefore, the conventional tape guide angle controlling apparatus has disadvantages in that when the position of tape T fluctuates when running in reverse mode, the tape T can be damaged. Also, when the tape mode changes back to a forward running, the positional fluctuation of tape T causes delays in audio signal reproduction by the audio/control head 5 because head 5 cannot accurately reproduce signals from the tape.

SUMMARY OF THE INVENTION

Therefore, it is an object of the present invention to provide a tape guide angle controlling apparatus for a the tape guide of a magnetic tape recorder-player that is capable of variably slanting the tape guide depending on whether the recorder-player is in a forward running mode or a reverse running mode of the tape.

It is another object of the present invention to guide the tape stably in the reverse running mode.

To achieve the above-described objects, a tape guide angle controlling apparatus according to the present invention comprises a main base, a bushing provided in the main base and having a vertical shaft hole in a center thereof, a tape guide arm having at one end portion thereof a rotation shaft rotatably inserted into the shaft hole of the bushing and at another end portion thereof having a tape guide, a tape guide horizontal-rotating means driven for horizontally rotating the tape guide arm, and a tape guide vertical-operating means driven by the tape guide horizontal-rotating means and vertically operating the tape guide arm.

Further, the tape guide angle controlling apparatus according to the present invention comprises a main base, a rotation shaft provided in the main base, a tape guide arm having at one end portion thereof a hub through which the rotation shaft is rotatably inserted and at another end portion thereof a tape guide mounted thereto, a cam gear mounted on an upper surface of the main base, and a tape guide vertical-operating cam means formed on a portion of a peripheral edge of the cam gear.

Still further, the tape guide angle controlling apparatus according to the present invention comprises a tape guide means including an upright tape guide for being contacted to a magnetic tape for guiding a forward and reverse tape running, and a control means for operating the tape guide means so that the uprightness of the tape guide to which the tape is movably contacted can be varied from the vertical.

DETAILED DESCRIPTION OF THE PREFERRED EMBODIMENTS

Figure 1:
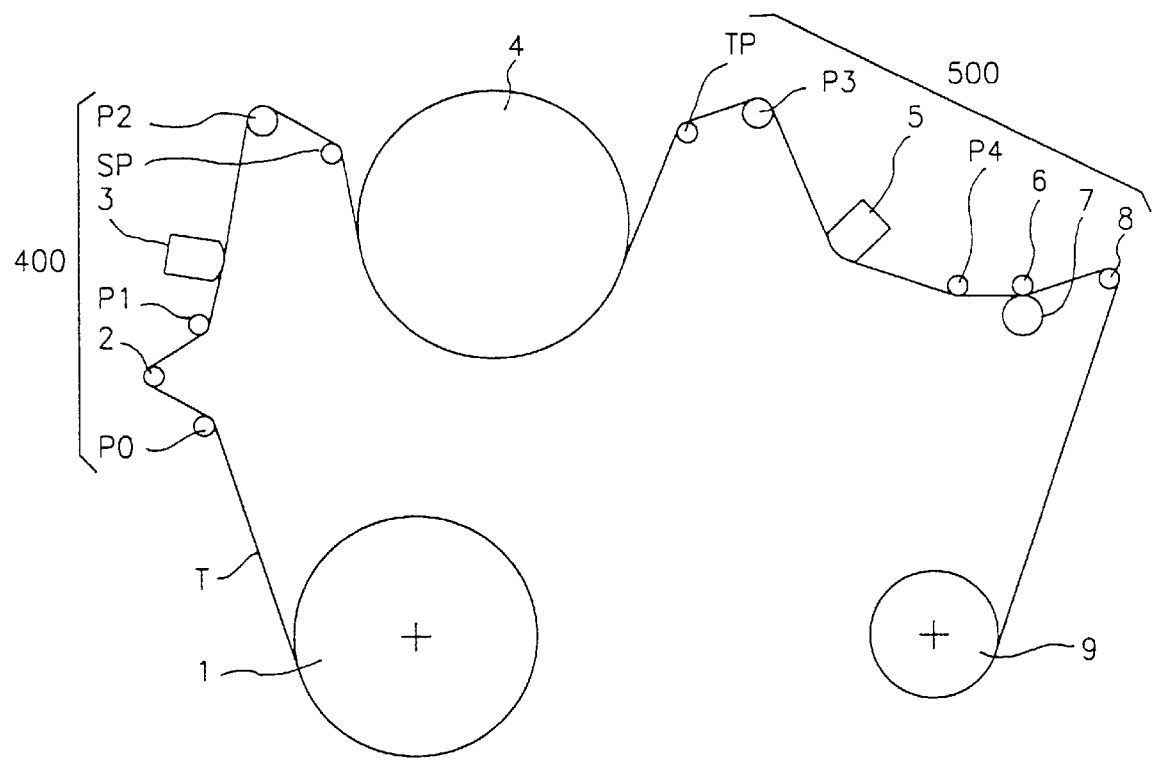
FIG. 1 is a plan view of a conventional magnetic tape running system.
Figure 2:
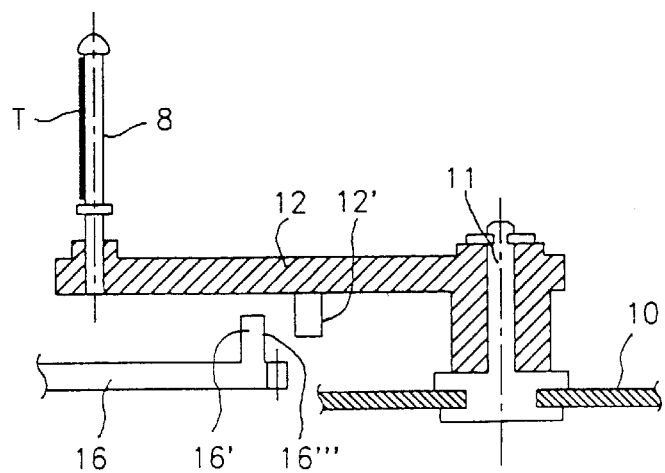
FIG. 2 is a cross-sectional view showing a conventional tape guide structure.
Figure 3A:
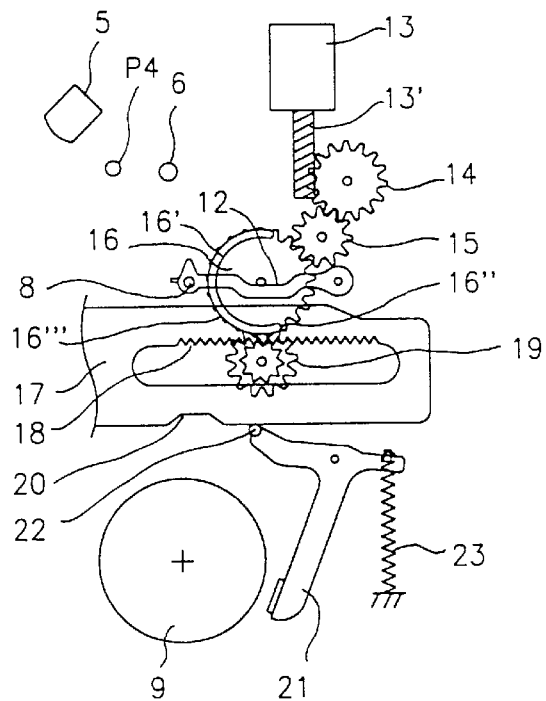
FIG. 3A is a plan view showing a stationary state in a magnetic tape running cycle, including a conventional tape guide angle controlling apparatus of a tape guide.
Figure 3B:
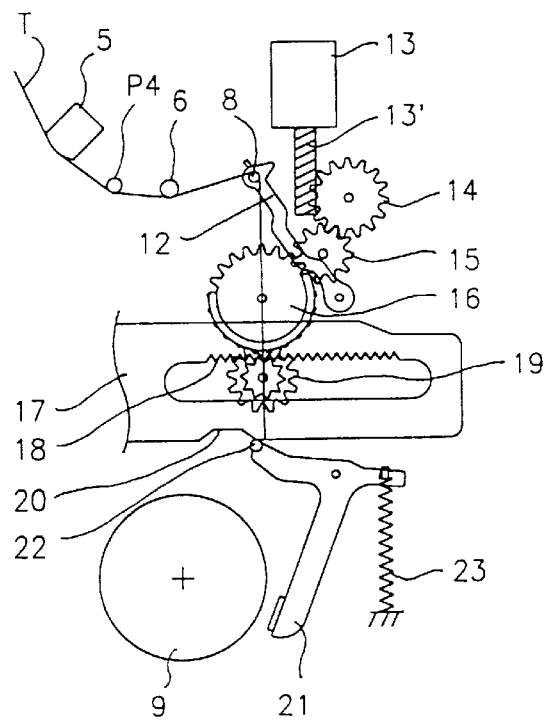
FIG. 3B is a plan view showing the conventional tape guide angle controlling apparatus of the tape guide in a forward running mode.
Figure 3C:
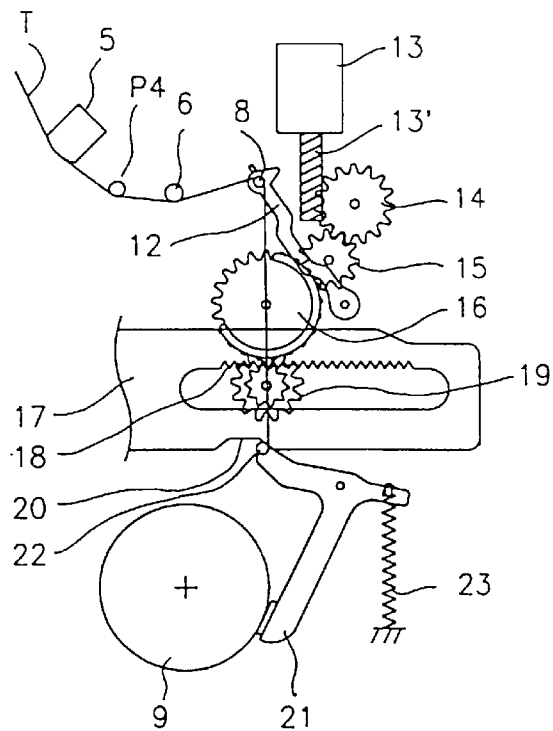
FIG. 3C is a plan view showing the conventional tape guide angle controlling apparatus of the tape guide in a reverse running mode.

With reference to the accompanying drawings, a tape guide angle controlling apparatus for a tape guide in accordance with a first embodiment of the present invention includes a main base 129 (see FIG. 5A), a tape guide arm 131, a rotation shaft 132, a bushing 140, a tape guide horizontal-rotating member and a tape guide vertical-operating member. Each of the above components will be detailed in the following description. In addition, audio/control head 5 and third post P4 (see, for example, FIG. 4A) correspond to audio/control head 105 and third post P4 as described above relative to the description of the conventional art.

Figure 7:
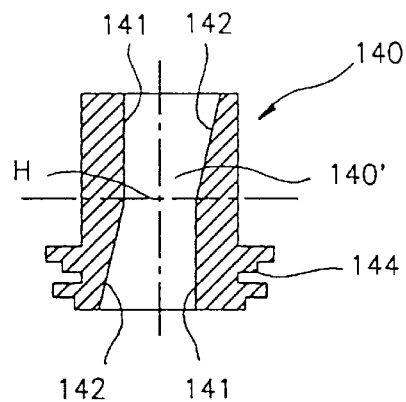
FIG. 7 is a partial cross-sectional view showing a bushing structure of a tape guide angle controlling apparatus in accordance with the first embodiment of the present invention.

The bushing 140 is insertingly mounted in the main base 129 and, as shown in FIG. 7, a shaft hole 140' is formed through the center of the bushing 140, perpendicular to the main base 129.

The shaft hole 140' includes a vertical support portions 141 for vertically supporting the tape guide 130 provided at the end of the tape guide arm 131 by vertically sustaining a rotation shaft 132 which is set in the shaft hole 140', and a slant support portions 142 slanted at a certain angle relatively to the main base 129 so as to tiltingly sustain the rotation shaft 132.

As shown in FIG. 7, the vertical support portions 141 and the slant support portions 142 are commonly symmetrical to the central point H of the bushing 140.

A position orienting projection 144 is formed on the outer periphery of the bushing 140 so that the slant support portions 142 can be oriented along the line Va—Va (see FIG. 4A) when the bushing 140 is mounted in the base 129 which has a recess therein (not shown) for receiving the position orienting projection 144.

Figure 5A:
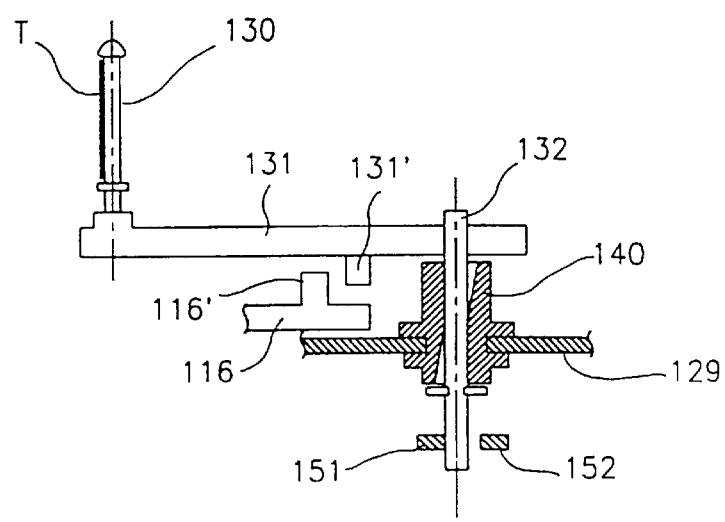
FIG. 5A is a cross-sectional view taken along the line Va—Va in FIG. 4A, showing the tape guide in accordance with the first embodiment of the present invention.
Figure 5B:
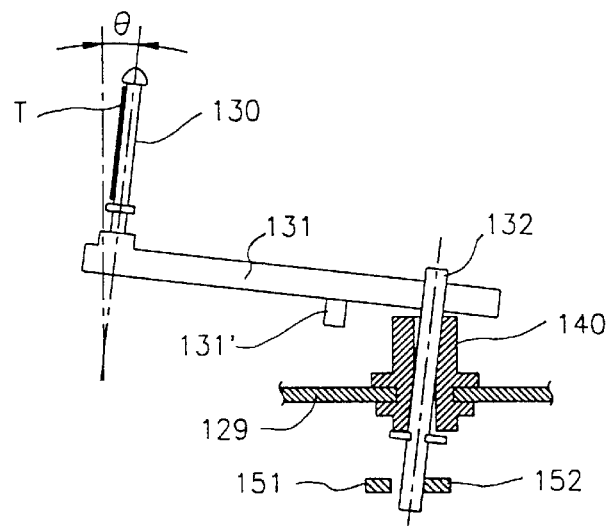
FIG. 5B is a cross-sectional view taken along the line Vb—Vb in FIG. 4B, showing the tape guide in accordance with the first embodiment of the present invention.

On the lower surface of the tape guide arm 131 there is formed an arm projection 131', as shown in FIGS. 5A and 5B, which is engageable by the cam gear 116. On one end of the tape guide arm 131 there is mounted a tape guide 130 for guiding the tape T. The rotation shaft 132 is rotatably inserted through the other end of the tape guide arm 131 and the shaft hole 140' formed through the center of the bushing 140.

The tape guide horizontal-rotating member for horizontally rotating the tape guide arm 131 in cooperation with the driving source 113 mounted on the main base 129 includes a first and second connection gears 114, 115 and a cam gear 116 engaged with the second connection gear 115. A cam arc projection 116' for rotating the tape guide arm 131 is provided on a portion of the peripheral edge of the cam gear 116.

Figure 6A:
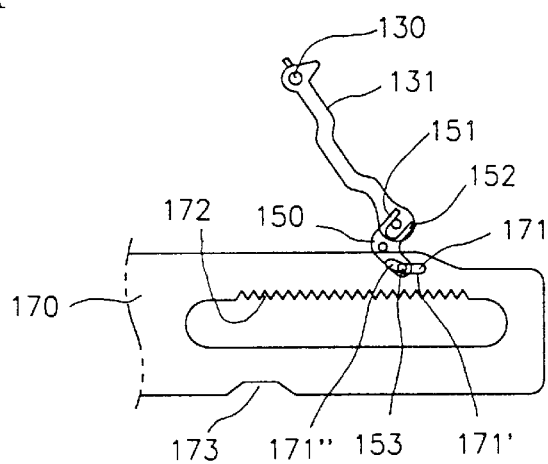
FIG. 6A is a plan view showing a forward running state of the magnetic tape recorder for describing the operation of the tape guide in accordance with the first embodiment of the present invention.

The tape guide vertical-operating member for vertically driving the tape guide arm 131 in cooperation with the driving source 113 includes a function slide 170 installed on the main base 129 and having a guide slot 171, and a vertical operating lever 150 (see, especially, FIG. 6A) pivotably installed on the main base 129. On one end portion of which lever 150 there is formed a projection 153 guided in the guide slot 171 of the function slide 170 as shown in FIG. 6A, and on the other end portion of the lever 150 is formed a pair of fork arms 151,152 which engage with the rotation shaft 132.

The guide slot 171 in function slide 170 is provided with a straight portion 171' generally parallel to the moving direction of the function slide 170 and an angled portion 171" inclined relative to the moving direction of the function slide 170.

The first fork arm 151 serves to position the tape guide 130 to be perpendicular to the main base 129. The second fork arm 152 is provided for pushing the rotation shaft 132 to on side so that the tape guide 130 can be slanted relative to the main base 129. The reference numeral 172 denotes a rack gear formed in the function slide 170 and reference numeral 173 indicates a recess in the function slide 170.

The operation of the thusly composed tape guide angle control apparatus in accordance with the first embodiment of the present invention will now be described.

Figure 4A:
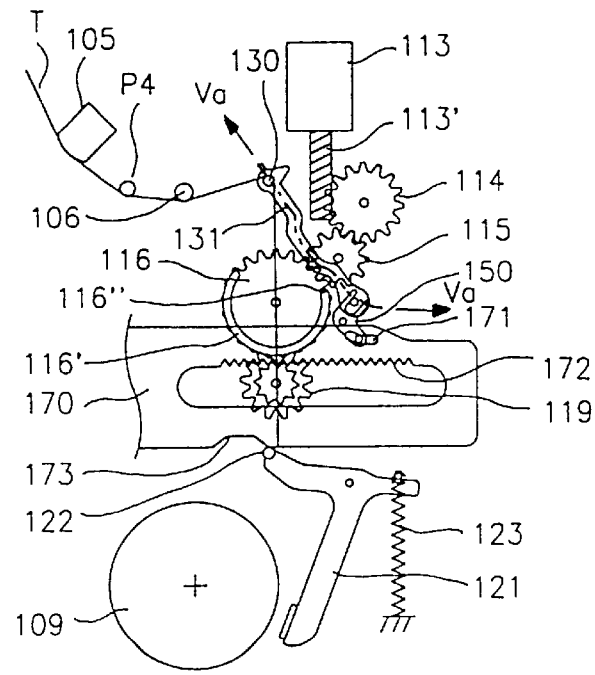
FIG. 4A is a plan view showing a tape guide angle controlling apparatus of a tape guide in accordance with a first embodiment of the present invention in a forward running mode.

First, when the tape T is run forward, driving force from the driving source 113 is transmitted via a worm gear 113' to the meshed first and second connection gears 114, 115 to the cam gear 116, so that the arm projection 131' on the tape guide arm 131 is engaged by cam arc tip 116" at one end of the cam arc 116' of the cam gear 116 as shown in FIG. 4A. At this time, the function slide 170 is moved by the pinion gear 119 engaged to the cam gear 116 and the projection 153 on the vertical operation lever 150 is positioned in the straight portion 171' of the guide slot 171. As shown in FIG. 5A, the first fork arm 151 comes to support the rotation shaft 132 and accordingly the shaft 132 contacts the vertical support portions 141 in the bushing 140.

Consequently, the tape guide 130 is placed vertical to the main base 129, thus easily guiding the forward running tape T. At this time, as shown in FIG. 4A, a brake protrusion 122 at the tip of a takeup reel brake lever 121 rides on an edge surface of the function slide 170 away from the recess 173, whereby the other end of the takeup reel brake lever 121 remains spaced from the periphery of the takeup reel 109.

Figure 4B:
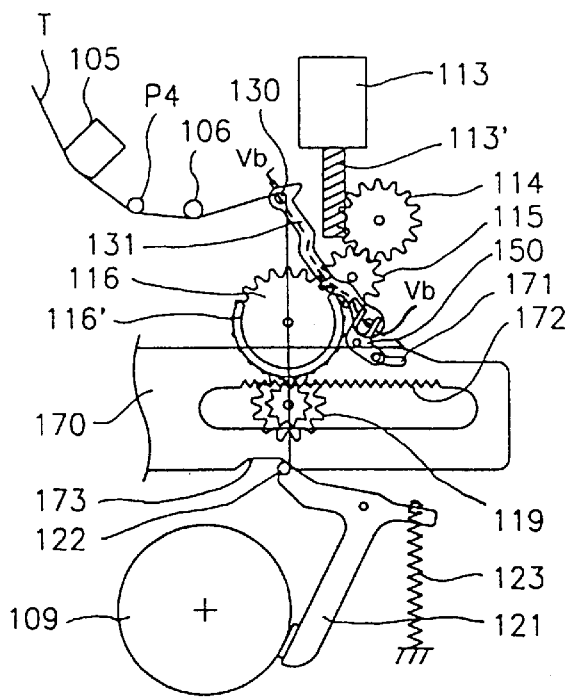
FIG. 4B is a plan view showing the tape guide angle controlling apparatus of the tape guide in accordance with the first embodiment of the present invention in a reverse running mode.

As shown in FIG. 4B, when the tape T is run in reverse, driving force from driving source 113 is transmitted via the meshed first and second connection gears 114, 115 to the cam gear 116, so that the pinion gear 119 is engagedly driven by the cam gear 116 and the function slide 170 moves to the right.

In accordance with the movement of the function slide 170 to the right, the projection 153 on the vertical operation lever 150 is guided into the angled slot portion 171', whereby the vertical operation lever 150 pivots anti-clockwise. Then, as shown in FIG. 5B, the second fork arm 152 pushes the rotation shaft 132 to one side so that it becomes supported by the slant support portions 142. As a result, the tape guide 130 becomes slanted at a certain angle corresponding to the angle of the vertical support portions 141.

The slanting of the tape guide 130 to one side by a predetermined angle θ (see FIG. 5B) causes the tape T released from the takeup reel to be regularly transferred to the capstan 106, thereby improving the reverse running operation of the tape T.

Also, the brake protrusion 122 at the end of the takeup reel brake lever 121 becomes positioned in the recess 173 and the takeup reel brake lever 121 contacts the takeup reel 109, whereby the rotation of the takeup reel 109 is controlled. As a result, the tension on tape T as it is unwound from the takeup reel 109 is maintained at a certain value.

Figure 6B:
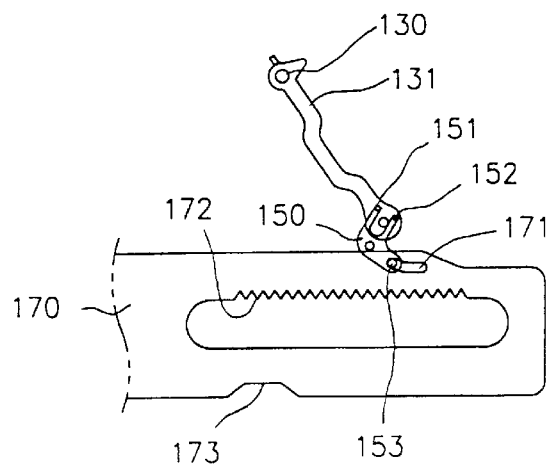
FIG. 6B is a plan view showing a reverse running state of the magnetic tape recorder for describing the operation of the tape guide in accordance with the first embodiment of the present invention.

FIGS. 6A and 6B illustrate the mechanism of the vertical operation lever 150 for vertically operating the tape guide arm 131 and including the guide hole 171 in the function slide 170.

With reference to the accompanying drawings, the tape guide angle controlling apparatus in accordance with the second embodiment of the present invention will now be described.

As shown in FIGS. 8 through 10, the tape guide angle controlling apparatus in accordance with the second embodiment of the present invention has at one end portion of a tape guide arm 225 a vertically mounted tape guide 226 for guiding the tape T and at the other end portion thereof a hub 227 is provided which is rotatably mounted on a rotation shaft 228 connected to a main base (not shown).

A cam gear 220 is installed on the main base plate (not shown) and a cam for driving the tape guide arm 225 is formed on the cam gear 220.

A tape guide vertical-operating member employed in the second embodiment of the present invention is provided on the cam gear 220 for driving the tape guide arm 225.

Figure 8A:
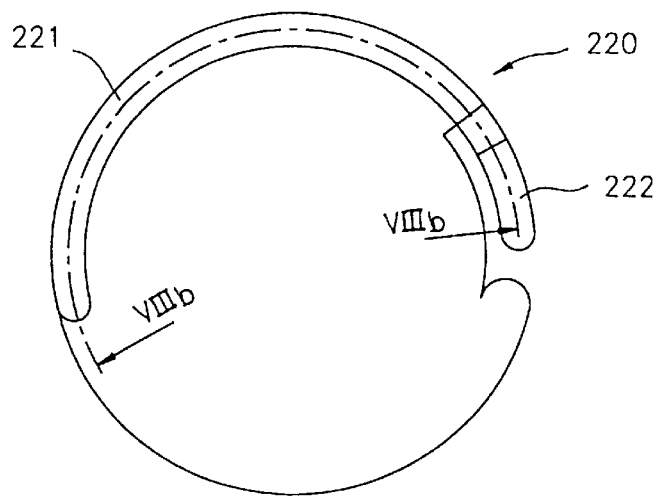
FIG. 8A is a plan view of a cam gear for operating a tape guide arm provided with a tape guide angle controlling apparatus in accordance with a second embodiment of the present invention.
Figure 8B:
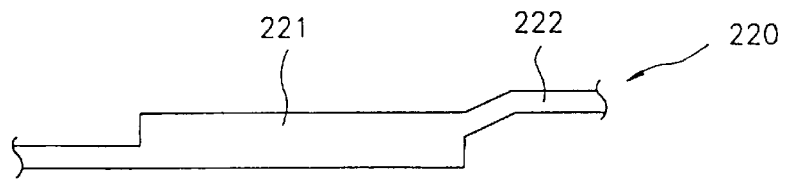
FIG. 8B is a cross-sectional view taken along the line VIIIb—VIIIb in FIG. 8A.

As shown in FIGS. 8A and 8B, the tape guide vertical-operating member includes a forward running cam portion 221 and a reverse running cam portion 222 each provided on the peripheral edge of the cam gear 220 so as to change the vertical angle of the tape guide 226.

As shown in FIG. 8B, the reverse running cam portion 222 projects upwardly by a certain height above the surface level of the forward running cam portion 221. When the tape T is run in reverse, the reverse running cam portion 222 contacts a lower surface portion of the tape guide arm 225, thereby raising the tape guide arm 225. As a result, the tape guide 226 is raised and tilted by a certain angle appropriate for the reverse running mode of the tape T.

The reverse running cam portion 222 is formed as a molded leaf spring to prevent over-loading and is extended along the periphery of the cam gear 220 from the forward running cam portion 221, thereby having an elastic property.

Figure 9A:
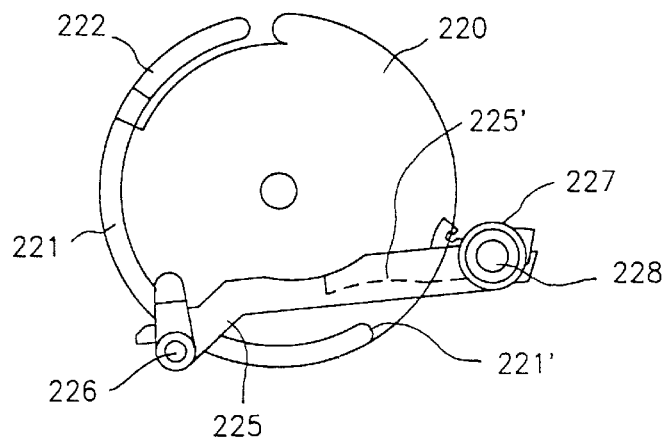
FIG. 9A is a plan view showing a tape guide in accordance with the second embodiment of the present invention in an unloaded mode.
Figure 9B:
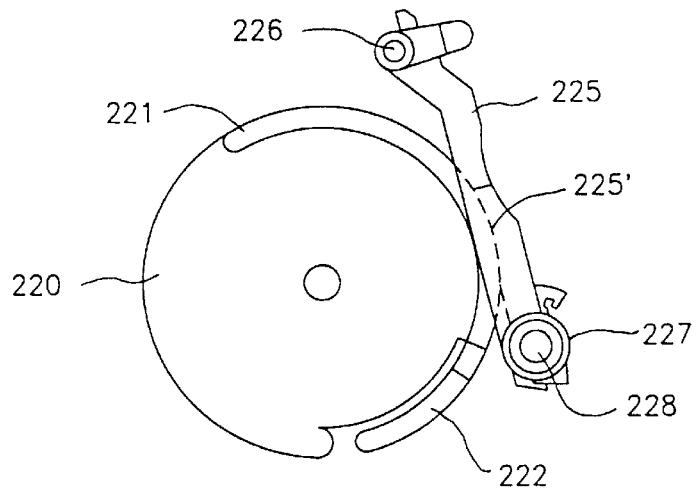
FIG. 9B is a plan view showing the tape guide in accordance with the second embodiment of the present invention in a forward running mode.
Figure 9C:
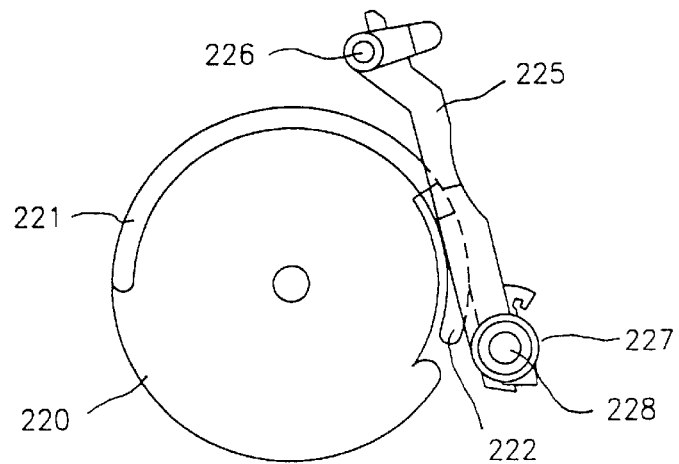
FIG. 9C is a plan view showing the tape guide in accordance with the second embodiment of the present invention in a reverse running mode.

As shown in FIGS. 9A through 9C, at one end portion of the tape guide arm 225 the tape guide 226 is provided and at the other end portion thereof the hub 227 connected to the main base (not shown) is provided, through which the shaft 228 extends. An arm projection 225' extends from the lower surface of the tape guide arm 225.

Figure 10A:
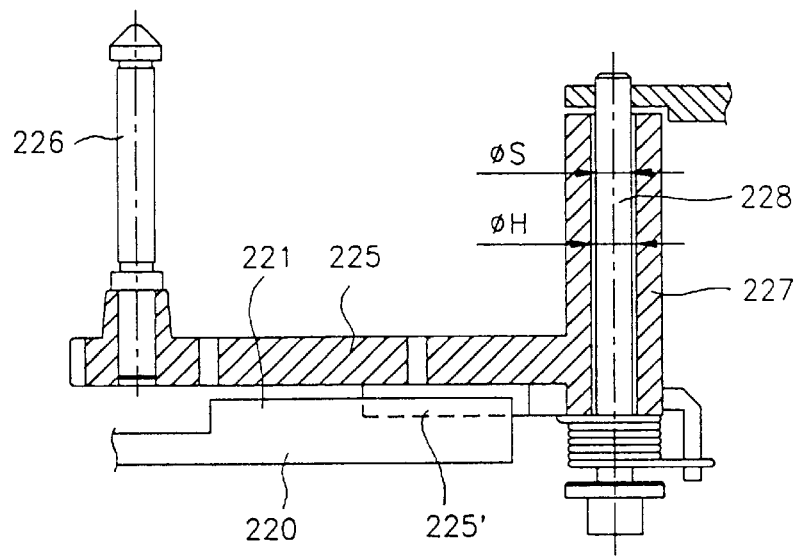
FIG. 10A is a cross-sectional view showing g a tape guide state in a forward running mode for illustrating the tape guide angle control in accordance with the second embodiment of the present invention.
Figure 10B:
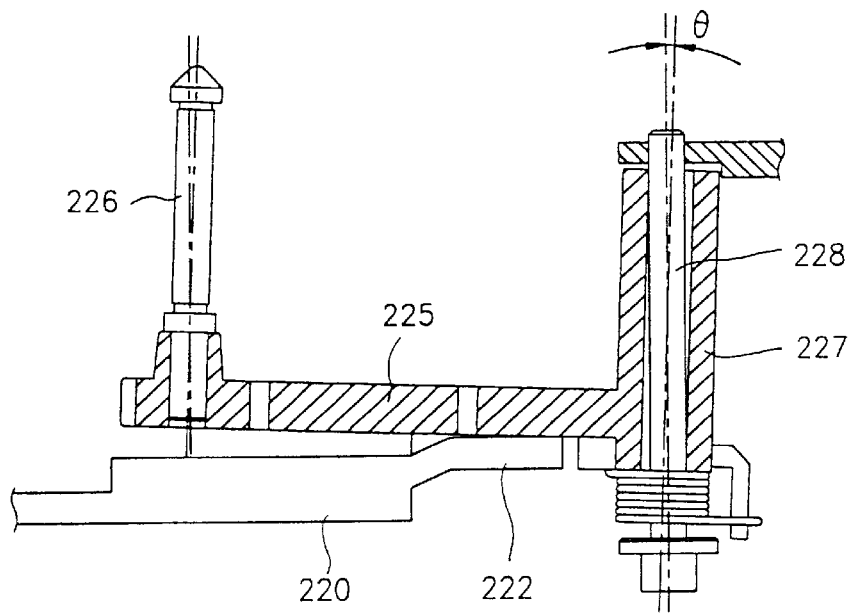
FIG. 10B is a cross-sectional view showing a tape guide state in a reverse running mode for illustrating the tape guide angle control in accordance with the second embodiment of the present invention.

In the embodiment as shown in FIGS. 10A and 10B, the hub ØH of the rotation shaft housing 227 is formed slightly larger than the diameter ØS of the shaft 228, so that the tape guide arm 225 can be rotated easily on the shaft 228 and at the same time the tape guide arm 225 can be tilted using the hub 227 as a pivot due to the gap between the inner diameter ØH of the hub 227 and the diameter ØS of the shaft 228.

Therefore, by tilting the tape guide arm 225, the angle and height of the tape guide 226 at the end of the tape guide arm 225 is controlled.

The operation and effect of the tape guide angle controlling apparatus in accordance with the second embodiment of the present invention will now be explained, as follows.

First, by the operation of the cam gear 220, the tape guide arm 225 is pushed upwardly by the tape guide vertical-operating member provided on the peripheral edge of the cam gear 220 and tilted by using the hub 227 as a pivot. Accordingly, the tape guide 226 guides the tape T in the reverse running mode.

More specifically, as shown in FIGS. 9B and 10A, in the forward running mode in which the cam gear 220 is driven counter-clockwise, cam arc tip 221' at the end of the forward running cam portion 221 pushes against the arm projection 225' on the tape guide arm 225. This horizontally rotates the tape guide arm 225 clockwise. At this time, the tape guide 226 remains vertical and perpendicular to the main base (not shown).

Referring to FIGS. 9C and 10B, in the reverse running mode, the cam 220 is rotated clockwise and the surface of the reverse running cam portion 222 (which is higher than the forward running cam portion 221) contacts the lower surface of the tape guide arm 225. The tape guide arm 225 is thereby tiltingly raised to a certain height in accordance with the gap between the inner diameter ØH of the hub 227 and the diameter ØS of the shaft 228. That is, when the tape guide arm 225 is raised by the reverse running cam portion 222, the lower portion of the shaft 228 contacts a right side lower portion of the hub 227 and the upper portion thereof contacts a left side upper portion of the hub 227, whereby the hub 227 and the tape guide 226 at the end of the tape guide arm 225 are tilted by a certain angle θ relative to the vertical.

As shown in FIGS. 10A and 10B, the tape guide arm 225 can be tiltingly raised using the hub 227 as a pivot due to the gap between the diameters ØH and ØS.

Because the tape guide arm 225 must be formed so as to be rotatable about the axis of the shaft 228, the inner diameter ØH of the hub 227 is made larger than the diameter ØS of the shaft 228.

The second embodiment of the present invention is directed to slating the tape guide 226.

Additionally, the reverse running cam portion 222 is formed on the peripheral edge of the cam 220 so as to extend from the forward running cam portion 221, and is formed as a molded left spring so as to have an elastic property.

Also, making the reverse running cam portion 222 elastically resilient prevents the tape guide arm 225 from being over-loaded.

As described above, the tape guide angle controlling apparatus of the present invention can improve tape running during forward and a reverse running modes because of a certain angle made by the tape guide against the main base.

Further, the improved tape running property at forward and reverse running modes prevents magnetic tape damage and audio signal delay.

What is claimed is:

1. A tape guide angle controlling apparatus for a magnetic tape recorder-player for tilting a tape guide which guides magnetic tape in a reverse running mode, comprising:

a main base;

a rotation shaft provided in the main base;

a tape guide arm having at one end portion thereof a hub through which the rotation shaft is rotatably inserted and at another end portion thereof a tape guide mounted thereto;

a cam gear mounted on an upper surface of the main base and being operatively connected to said tape guide arm; and a tape guide vertical-operating cam means formed on a portion of a peripheral edge of the cam gear for inclining said tape guide to said upper surface of the main bases wherein the tape guide vertical-operating cam means includes a forward running cam portion and a reverse running cam portion, each for varying an angle of the tape guide depending upon a tape running mode, wherein the reverse running cam portion is formed higher than the forward running cam portion so as to tilt the tape guide to a desired extent when the reverse running cam portion contacts a lower surface of the tape guide arm to thereby raise the tape guide arm.

2. The apparatus of claim 1, wherein an inner diameter of the hub of the tape guide arm is formed larger than a diameter of the rotation shaft, whereby the tape guide arm may be wobbled on the rotation shaft using the hub as a pivot for slanting the tape guide.

3. An apparatus for controlling an angle at which a tape guide in a magnetic tape recorder-player is slanted relative to vertical, comprising:

a main base;

a rotation shaft mounted on said main base;

a tape guide arm rotatably and tiltably mounted on said rotation shaft at a first end and having a tape guide formed at a second end; and a cam gear rotatably mounted on said main base and including a cam portion, said cam portion including a forward running portion and a reverse running portion formed higher than said forward running portion, said cam gear being arranged relative to said tape guide arm such that, in a reverse running mode of the tape recorder-player, said cam gear is rotated so that said reverse running portion of said cam portion contacts said tape guide arm, causing said tape guide arm, and in turn, said tape guide to tilt.

4. The apparatus of claim 3, wherein, in a forward running mode, said cam gear is rotated so that said forward running portion of said cam portion is placed opposite said tape guide arm without contacting said tape guide arm, thereby maintaining said tape guide arm, and in turn, said tape guide in a vertical position.

5. The apparatus according to claim 3, wherein said tape guide arm includes a hub at said first end, said hub having a bore formed therein for receiving said rotation shaft whereby said tape guide arm is rotatably mounted, a diameter of said bore being larger than a diameter of said rotation shaft, whereby said tape guide arm is tiltable relative to said rotation shaft.

6. The apparatus of claim 5, wherein said reverse running portion includes a resilient portion to prevent over-loading said tape guide arm and extends continuously from said forward running portion.

\* \* \* \* \*